(12) United States Patent
Murphy, Jr.

(10) Patent No.: US 10,902,125 B2
(45) Date of Patent: Jan. 26, 2021

(54) INFECTED FILE DETECTION AND QUARANTINE SYSTEM

(71) Applicant: Walmart Apollo, LLC, Bentonville, AR (US)

(72) Inventor: David Wayne Murphy, Jr., Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 261 days.

(21) Appl. No.: 15/946,422

(22) Filed: Apr. 5, 2018

(65) Prior Publication Data

US 2018/0293382 A1 Oct. 11, 2018

Related U.S. Application Data

(60) Provisional application No. 62/482,484, filed on Apr. 6, 2017.

(51) Int. Cl.
*G06F 21/56* (2013.01)
*G06F 21/55* (2013.01)

(52) U.S. Cl.
CPC .......... *G06F 21/568* (2013.01); *G06F 21/554* (2013.01); *G06F 21/561* (2013.01); *G06F 21/564* (2013.01); *G06F 21/565* (2013.01); *G06F 2221/034* (2013.01)

(58) Field of Classification Search
CPC ......... G06F 21/554; G06F 21/561–562; G06F 21/564–565; G06F 21/568; G06F 2221/034; H04L 63/145
See application file for complete search history.

(56) References Cited

U.S. PATENT DOCUMENTS

| | | | |
|---|---|---|---|
| 5,623,600 A * | 4/1997 | Ji | G06F 21/564 726/24 |
| 6,701,440 B1 | 3/2004 | Kim et al. | |
| 7,299,361 B1 | 11/2007 | Kim et al. | |
| 7,523,487 B2 | 4/2009 | Muhlestein | |
| 7,634,814 B1 * | 12/2009 | Sobel | G06F 21/51 709/205 |
| 8,090,393 B1 * | 1/2012 | Whitehouse | G06F 21/56 455/466 |
| 8,332,946 B1 * | 12/2012 | Boisjolie | H04L 63/145 726/24 |

(Continued)

OTHER PUBLICATIONS

International Search Report and Written Opinion from related International Patent Application No. PCT/US2018/026211 dated Jun. 27, 2018.

*Primary Examiner* — Minh Dinh

(74) *Attorney, Agent, or Firm* — McCarter & English, LLP

(57) ABSTRACT

Described in detail herein is an infected file detection and quarantine system. A pre-scan staging server can receive a set of data files. The pre-scan staging server can determine a type of each of the data files in the set. The pre-scan staging server can select a virus scan application for each type of data file in the set. The pre-scan staging server can detect whether the data files in the set are infected with a virus or malware in response to execution of the at least one virus scan application for each data file type. The post-scan staging server can receive the uninfected data files. The post-scan staging server can transmit a message including a link for retrieving the uninfected data files.

20 Claims, 4 Drawing Sheets

(56) References Cited

U.S. PATENT DOCUMENTS

| | | |
|---|---|---|
| 8,621,610 B2 | 12/2013 | Oberheide et al. |
| 8,813,222 B1 | 8/2014 | Codreanu et al. |
| 8,839,431 B2 | 9/2014 | Bennett |
| 8,955,137 B2 | 2/2015 | Mousty et al. |
| 9,111,094 B2 | 8/2015 | Turbin et al. |
| 2002/0103783 A1* | 8/2002 | Muhlestein ............ G06F 21/562 |
| 2002/0178381 A1* | 11/2002 | Lee ........................ G06F 21/566 |
| | | 726/12 |
| 2003/0191957 A1* | 10/2003 | Hypponen ............ G06F 21/561 |
| | | 726/24 |
| 2004/0078580 A1* | 4/2004 | Hsu ........................ H04L 63/145 |
| | | 713/188 |
| 2004/0255161 A1* | 12/2004 | Cavanaugh ......... H04L 63/1408 |
| | | 726/23 |
| 2005/0064850 A1 | 3/2005 | Irlam et al. |
| 2005/0120229 A1* | 6/2005 | Lahti ..................... G06F 21/564 |
| | | 713/188 |
| 2009/0044024 A1 | 2/2009 | Oberheide et al. |
| 2012/0110667 A1* | 5/2012 | Zubrilin ................ G06F 21/56 |
| | | 726/24 |
| 2013/0091549 A1 | 4/2013 | Joyce et al. |
| 2013/0139260 A1* | 5/2013 | McDougal .......... H04L 63/1433 |
| | | 726/23 |
| 2014/0181969 A1* | 6/2014 | Mousty ............... H04L 63/1408 |
| | | 726/23 |
| 2015/0020203 A1 | 1/2015 | Xie et al. |
| 2015/0278520 A1 | 10/2015 | Mraz et al. |
| 2015/0347753 A1 | 12/2015 | Tuvell et al. |
| 2017/0262632 A1* | 9/2017 | Jaman ................... G06F 21/566 |

\* cited by examiner

INFECTED FILE DETECTION AND QUARANTINE SYSTEM

CROSS-REFERENCE TO RELATED PATENT APPLICATIONS

This application claims priority to U.S. Provisional Application No. 62/482,484 filed on Apr. 6, 2017, the content of which is hereby incorporated by reference in its entirety.

BACKGROUND

Infected data files (e.g., those including viruses, worms, Trojan horses, or other malicious code) may infect computing resources in distributed networked computing systems causing damage to the distributed computing system, corruption of data in the distributed computing system, and security lapses in the distributed computing system. Preventing the introduction and dissemination of infected data files in distributed networked computing systems can be difficult; particularly, when there are large amounts of data files having different file types for different applications in the distributed computing system and/or that are being introduced into the computing system.

BRIEF DESCRIPTION OF DRAWINGS

The accompanying figures, which are incorporated in and constitute a part of this specification, illustrate one or more embodiments of the present disclosure and, together with the description, help to explain embodiments of the present disclosure. The embodiments are illustrated by way of example and should not be construed to limit the present disclosure. In the figures.

DETAILED DESCRIPTION

Figure 1:
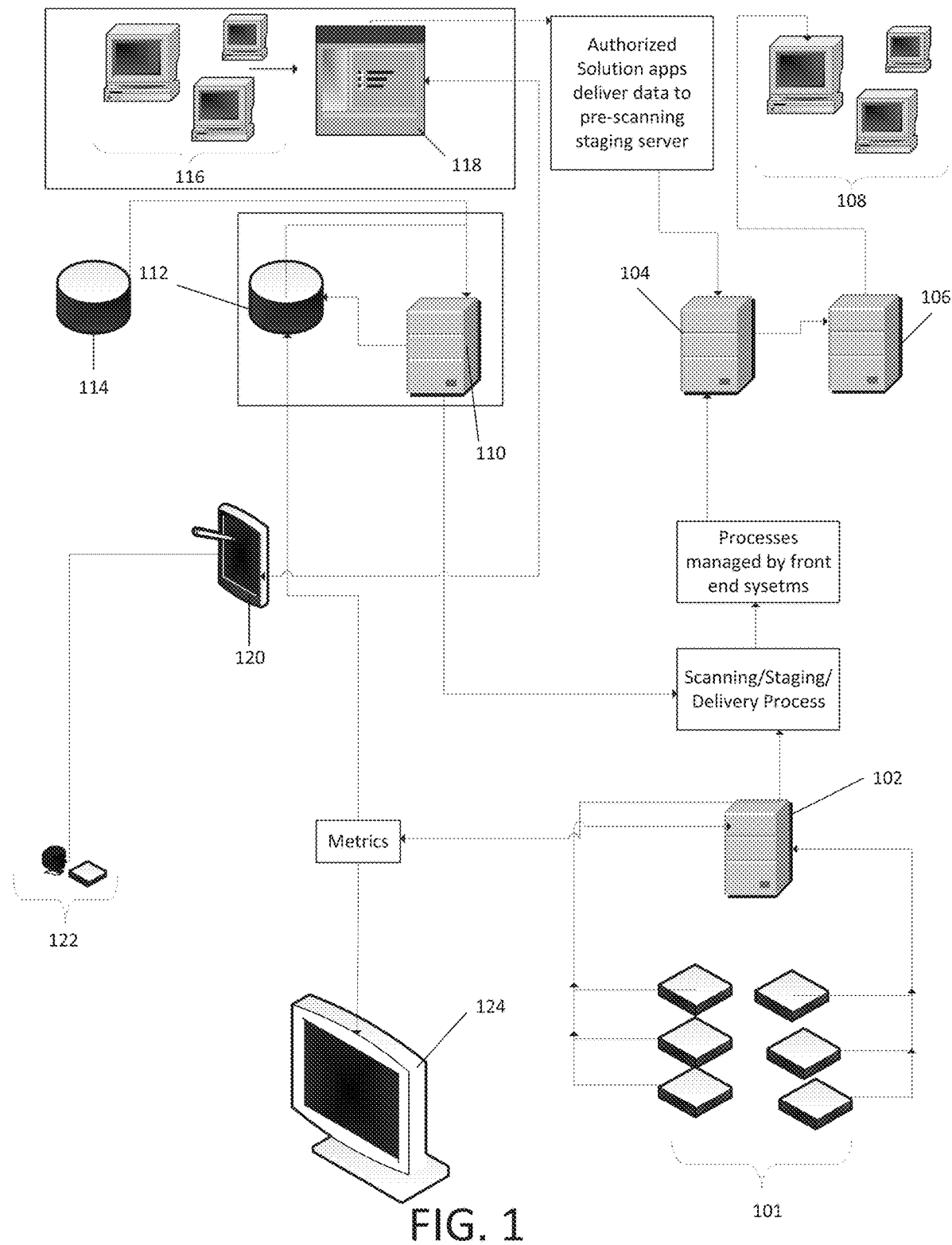
FIG. 1 is a block diagram of an infected file detection and quarantine system in accordance with an exemplary embodiment.

Described in detail herein is an infected file detection and quarantine system. In a digital forensics and/or data recovery environment a large amount of production data is constantly being created to be delivered to requestors in a networked environment. Embodiments of the infected file detection and quarantine system provides for securely scanning received data and efficiently returning the data while maintaining the integrity of the network and computing resources on the network. Embodiments of the infected file detection and quarantine system can eliminate bottlenecks, addresses security posture concerns, and provides real-time metrics using current and historical tracking records.

Embodiments of the infected file detection and quarantine system can include a pre-scan server and a post-scan server. The pre-scan staging server can include a receiving storage device, a scanning storage device and a quarantine storage device. A set of data files can be can be received by the pre-scan staging server, and the pre-scan staging server can store the set of data files in the receiving storage device upon receipt by the pre-scan staging server. The pre-scan staging server can transfer the set of the data files from the receiving storage device to the scanning storage device in response to execution a pre-scan process. The pre-scan staging server can determine a file type associated with each of the data files in the set. The pre-scan staging server can select a virus scan application for each type of data file in the set, and can execute the virus scan applications selected for each type of data file on the corresponding data files in the set based on the type of data file.

The pre-scan staging server can detect whether the scanned data files in the set are infected with a virus or malware in response to execution of the at least one virus scan application on the data files based on the data file type associated with each data file. The pre-scan staging server can transfer a first subset of the data files in the set that are infected with the virus or the malware from the scanning storage device to the quarantine storage device in the pre-scan staging server. The pre-scan staging server can transfer a second subset of the data files in the set that are determined to be uninfected to the post-scan staging server in response to execution of the at least one virus scan application on the second subset of the data files based on the data file type associated with each data file in the second subset.

The second subset of the data files can be stored in a post-scan storage device of the post-scan staging server upon receipt by the post-scan staging server. The post-scan staging server can transfer the second subset of the data files from the post-scan storage device to an access storage device of the post-scan staging server, and can transmit a message including a link for retrieving the second subset of the data files to a user account of a user associated with the second subset of the data files in response to transferring the second subset of the data files to the access storage device.

The first subset of the data files can be irretrievable by the user. The pre-scan staging server receives the set of data files from one or more of: external hard drives, a web application or a mobile device. A computing system can be communicatively coupled to the post-scan staging server. The computing system can be configured to receive the message from the post scan staging server. The link included in the message can reference a location of the second subset of the data files in the access storage device. The message can include a first list including the first subset of the data files and a second list identifying the second subset of the data files. The post-scan staging server can be configured to erase the second subset of the data files stored in the access storage device after a specified amount of time. The post-scan staging server is further configured to track a quantity of infected data files. The post-scan staging server is further configured to generate a graphical representation corresponding to the quantity of infected data files. The message can include the graphical representation.

FIG. 1 is a block diagram of an infected file detection and quarantine system 100 in accordance with an exemplary embodiment. In exemplary embodiments, the infected file detection and quarantine system 100 can include data storage devices 101 (e.g., internal/external hard drives), an application server 102, a pre-scan staging server 104, a post-scan staging server 106, computing systems 108, a web-server 110, a metrics storage device 112, a backend data storage device 114, forensic systems 116, an intranet application 118, a mobile device 120, data storage devices 122 (e.g., hard drives), and a display 124.

The pre-scan staging server 104 can receive data files from the data storage devices 101, the forensic systems 116 and the mobile device 120. The data storage devices 101 can upload or communicate a set of data files to be scanned to the application server 102. In one embodiment, the data storage device 101 can include external hard drives. The external hard drives can be physical connected to the application server 102. The external hard drives can transmit the data files over the physical connection. Alternatively, the data storage devices 101 can be connected to the application server 102 through a wireless connection. The data storage devices 101 can transmit the data files over the wireless connection. The application server 102 can receive the files from the data storage devices 101 and transmit the data files to the pre-scan staging server 104.

The forensic systems 116 can communicate the data files to the intranet web-application 118. The intranet web-application 118 can only be accessed via authorized devices in the forensic systems 116. The intranet web application 118 can be in communication with the pre-scan staging server 104 via a secure and encrypted data channel. The web-application 118 can transmit the data files received by the forensic systems 116 to the pre-scan staging server 104. The web-application 118 can be permitted to deliver the data files to the pre-scan staging server 104. In exemplary embodiments, the data channel can be configured from one way data transfers such that the web-application 118 cannot retrieve the data files from the pre-scan staging server 104. As an example, authorized solution applications (i.e., web-application 118) can deliver data to the pre-scan staging server 104. The authorized solution applications can write and delete. Data may not be able to be retrieved until the data has been scanned.

Mobile devices 120 can also transmit data files to the pre-staging server 104. The mobile device 120 can transmit data files from the memory of the mobile device 120. Alternatively, a physical hard drive 122 can be coupled, physically or wirelessly, to the mobile device 120. As an example, a mobile application can allow the data from physical hard drive 122 to be taken directly into the system. The physical hard drive 122 can include the data files. The mobile device 120 can communicate the data files from the physical hard drive 122 to the pre-staging server 104.

The pre-scan staging server 104 can execute a virus and infection scan on the received data files. Infected files detected via the virus and infection scan can be stored in a separate quarantined data store of the pre-scan staging server and uninfected data files can be transferred from the pre-scan staging server to the post-scan staging server 106. The pre-scan staging server and the post-scan staging server 106 are described in further detail with respect to FIG. 2. The infected files can be irretrievable by a user after being stored in the quarantined data store. In response to receiving uninfected data files, the post-scan staging server 106 can generate a message. The message can include a link to a memory location at which the uninfected data files are stored by the post-scan staging server. Alternatively, the message can include the uninfected data files. The message can be in one or more formats including: e-mail, Short Messaging Service (SMS) and an alert transmitted through a web-application. The message can be transmitted to the computing systems 108 and/or the mobile device 120. The computing systems 108 can be associated to one or more users with wired or wireless access to the computing systems 108.

In some embodiments, metrics associated with the data files can be ascertained by the pre-scan staging server before the virus scan is executed and metrics associated with the data files can be ascertained by the pre-scan staging server after the virus scan is executed. The metrics before and after the virus scan can be stored in a metrics database of the metrics data store 112 in real-time (as the data files are scanned). The web-server 110 can process the metrics data stored in the metrics database and can also access back-end data from a backend database in the backend data storage device 114 to correlate with the metrics data. As an example, queries from the back-end server can retrieve case data from the back-end data storage device 114 in order to make the process more efficient and enable real-time correlated metrics. The web-server 110 can generate graphical representations of the metric data stored in the metrics database (and the back-end database). The graphical representations can transmitted to the display 124 and displayed on a graphical user interface (GUI) on the display. The graphical representations can be 3D graphics. The graphical representations can also be transmitted to the mobile device 120. The metrics data can include amount of data processed, number of malware infections detected, number of malware infections purged and lab case turn-times. As a non-limiting example, metrics can be recorded to the ISADD DB (i.e., metrics storage device 112) in real-time and can be both accessed for reporting and pushed to an external display (i.e., display 124) via a front-end management application. Metrics can include information such as amount of data processed, number of malware, infections purged, lab-case turn-times.

As a non-limiting example, example, the scanning/staging/delivery processes can be initiated and managed either from a remote browser via an analyst interface or locally from a control interface. In response to initiating the scanning/staging/delivery processes, the processes can be managed by front end systems. Data to be delivered can be scanned in place an any items that report positive for malware can be quarantined on the pre-scan staging server. The remaining data can be moved to the post staging server. A user can receive an email message providing a link to access the data. The link can be actuated to initiate the data to be automatically delivered to the user. The user can also receive a report detailing any infected items that may not be delivered, instructions for disputing the infected items, or requesting additional assistance.

Figure 2:
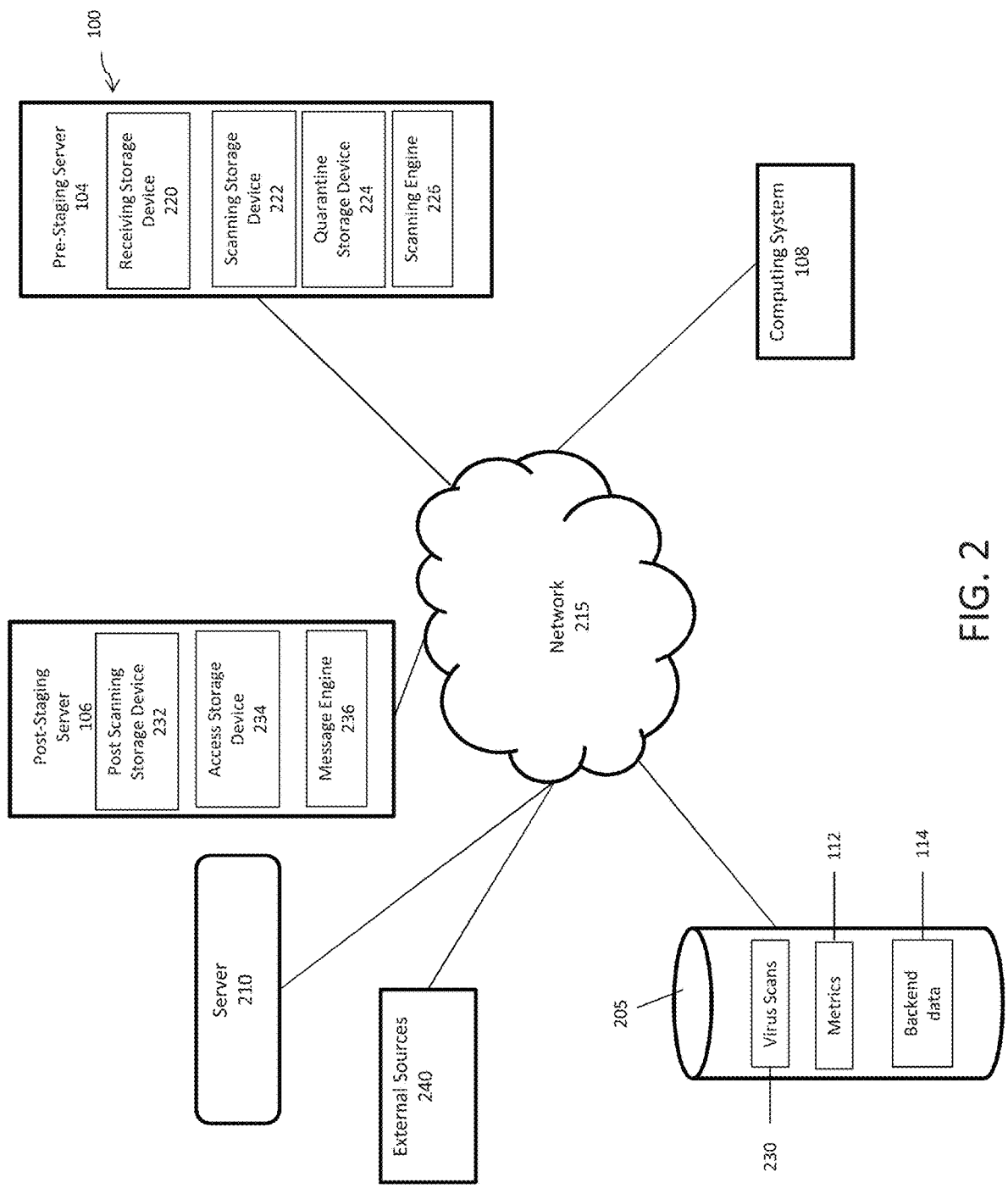
FIG. 2 is a network environment for the infected file detection and quarantine system in accordance with an exemplary embodiment.

FIG. 2 illustrates an distributed computing environment of an embodiments of the infected file detection and quarantine system 100. The infected file detection and quarantine system 100 can include one or more databases 205, one or more of pre-scan staging servers 104, one or more post-scan staging servers 106, computing systems 108 and one or more external data sources 240. The pre-scan staging servers 104 and post-scan staging servers 106 can be in communication with the database(s) 205 and one or more external sources 240, via a communications network 215. The external sources 240 can include data storage devices (e.g., data storage devices 101 as shown in FIG. 1, a web-application (e.g. web-application 116 as shown in FIG. 1), and/or mobile devices (e.g. mobile devices 120 as shown in FIG. 1). The pre-scan staging servers 104 can include a receiving storage device 220, a scanning storage device 222, a quarantine storage device 224 and a scanning engine 226. The post-scan staging servers 106 can include a post-scan storage device 232, access storage device 234, and a message engine 236.

In an example embodiment, one or more portions of the communications network 215, can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The pre-scan staging servers 104 and post-scan staging servers 106 includes one or more computers or processors configured to communicate with the databases 205, servers 210, computing systems 108, and external sources 240 via the network 215. The pre-scan staging servers 104 and post-scan staging servers 106 host one or more applications configured to interact with the infected file detection and quarantine system 100. The databases 205 may store information/data, as described herein. For example, the databases 205 can include a metrics database 112, a backend data database 114 and a virus scans database 230. The metrics database 112 can include metrics data associated with data files which are scanned, infected and quarantined. The backend data database 106 can include backend data associated with past data files that were scanned, infected and quarantined. The virus scans database 240 can include virus scan programs for different types of file types. The databases 205 and server 210 can be located at one or more geographically distributed locations from each other or from the pre-scan staging servers 104 and post-scan staging servers 106. Alternatively, the databases 205 can be included within server 210 or pre-scan staging servers 104 and post-scan staging servers 106.

In exemplary embodiments, the external sources 240 can transmit data files to the pre-scan staging server 104. The external sources 240 can be associated with one or more users. The data files can be of various file types and can be formatted for execution by specific applications operating on computing devices employing specific operating systems. For example, the data files can be one or more of: a executable, a document, a compressed folder, a cabinet file, image file, video file, Microsoft® Office file, a 3-D image file, a 3-D video file, an AutoCAD File, a PDF and any other type of file. The data files can contain different types of data in different types of formats based on the file type.

In exemplary embodiments, the computing systems can employ one or more operating systems to facilitate execution of the applications that are configured to consume the data files associated with certain data file types. As one example, the computing systems can be configured to employ an operating system manufactured by Microsoft®, such as any version of the Microsoft Windows® operating system. The pre-scan staging server 104 can employ an operating system that is different from the operating system implemented by the computing systems 108. For example, the pre-scan staging server 104 can be configured to employ a Unix operating system and the pre-scan server 104 can be programmed to execute different virus scan application based on the file types. In some embodiments, the pre-scan staging server employing the Unix operating system emulate the environment and operating systems of the computing systems 108 and can execute the virus scan applications in the emulated environment. By using an operating system in the pre-scan staging server 104 that is different than the operating system(s) used by the computing system and that is associated with the data file types, the pre-scan staging server can be insulated from potential viruses and malware in any of the data files because such viruses and malware cannot exploit the operating system of the pre-scan staging server 104.

The pre-scan staging server 104 can execute the scanning engine 226 in response to receiving the data files. The scanning engine 226 can be programmed to include a set of virus scan applications, where it virus scan application can be programmed to scan one or more data file types. The receiving storage device 220 can receive the data files from the external sources 240. The receiving storage device 220 can transfer the files to the scanning storage device 222. The scanning engine 226 can read each data file, determine the file type of each of the data files based on the data included within the data files, and select a virus scan application from the available set of virus scan applications for each of the different file types of the data files in the scanning storage device 222. The scanning engine 226 can select and execute each of the virus scan applications based on the file types associated with the data files to be scanned. The scanning engine 226 can scan the data files in parallel or sequentially and can generate multiple instances of the scanning applications to scan the data files. The virus scan applications process each respective data file and can detect and indicate the data files which are infected with viruses, malware, computer "worms", ransomware, trojan horses, keyloggers, rootkits, spyware, adware, and/or malicious Browser Helper Object. The scanning engine 226 can determine each data file which has been indicated as infected and can transfer each of the infected data files to the quarantine storage device 224. The quarantine storage device 224 can be physically and functionally separated from the receiving storage device 220, the scanning storage device 224 and the scanning engine 226, and can the data files stored in the quarantine storage device 224 can be irretrievable by users. The data files which are uninfected can be transferred to the post-scan staging server 106.

The post-scan staging server 106 can receive the uninfected data files in the post scanning storage device 232. The post-scan staging server 106 transfer the uninfected data files from the from the post scanning storage device 232 to the access storage device 234. The access storage device 232 can be accessible to third party systems, while the post scanning storage device 232 can remain inaccessible to third party systems at all times. The post-scan staging server 106 can execute the message engine 236 in response to transferring the uninfected data files to the access storage device 234. The message engine 236 can generate a hyperlink of location of the data files within the access storage device 234. The location contained in the hyperlink can be specific location of the data files within the access storage device 234, so that no other data files stored in the access storage device 234 can be accessed using the hyperlink. The message engine 236 can also generate a message. The message can include a list of uninfected data files and a list of infected data files. The message can also include the generated hyperlink of the location of the uninfected data files. The message engine 236 can transmit the message to a computing system 108. The device can be associated with the one or more users of the external sources 240. As mentioned above, the message can be embodied as an E-Mail, SMS, MMS, web-application notification, alert or any other messaging format acceptable by the computing system 108. A user can access the message and access the uninfected data files using the hyperlink. In response to actuating the hyperlink the user can be directed to the specific location of the uninfected data files in the access storage device 234. The user can download the uninfected data files from the access storage device 234.

In some embodiments, the message can include an option for processing the infected data files stored in the quarantine storage device 224. The user can select an option to attempt disinfect the infected data files. In response to the user selecting the option to disinfect the infected data files. The scanning engine 226 can attempt to disinfect the infected data files. In response to disinfecting the infected data files, the scanning engine 226 can transmit the disinfected data files to the post-scan staging server 106 for retrieval. The pre-scan staging server 104 can purge the data files quarantine storage device 224 after a specified amount of time. The post-scan staging server 104 can purge data files stored in the access storage device 234 after a specified amount of time.

In some embodiments, the external sources 240, pre-scan staging server 104 and the post-scan staging server 106 can transmit data associated with the data files to the metrics database 112 and backend data database 114. For example, the external sources 240 can transmit data associated with the amount of data files being transferred to the pre-scan staging server 104, type of external source 240 transferring the data files and timestamp of data files being transferred, to the metrics database 112. The pre-scan staging server 106 can transmit data associated with the file types of the data files received, the amount of infected data files, the amount of uninfected data files, the amount of uninfected and infected data files by file type, and time required to scan the data files, to the metrics database 112. The post scan staging server 106 can transmit data associated with the amount of uninfected data files received, amount of time taken to access the uninfected data files by the users, amount of times, un-retrieved uninfected data files were purged, to the metrics database 112 and the backend data database 114.

Figure 3:
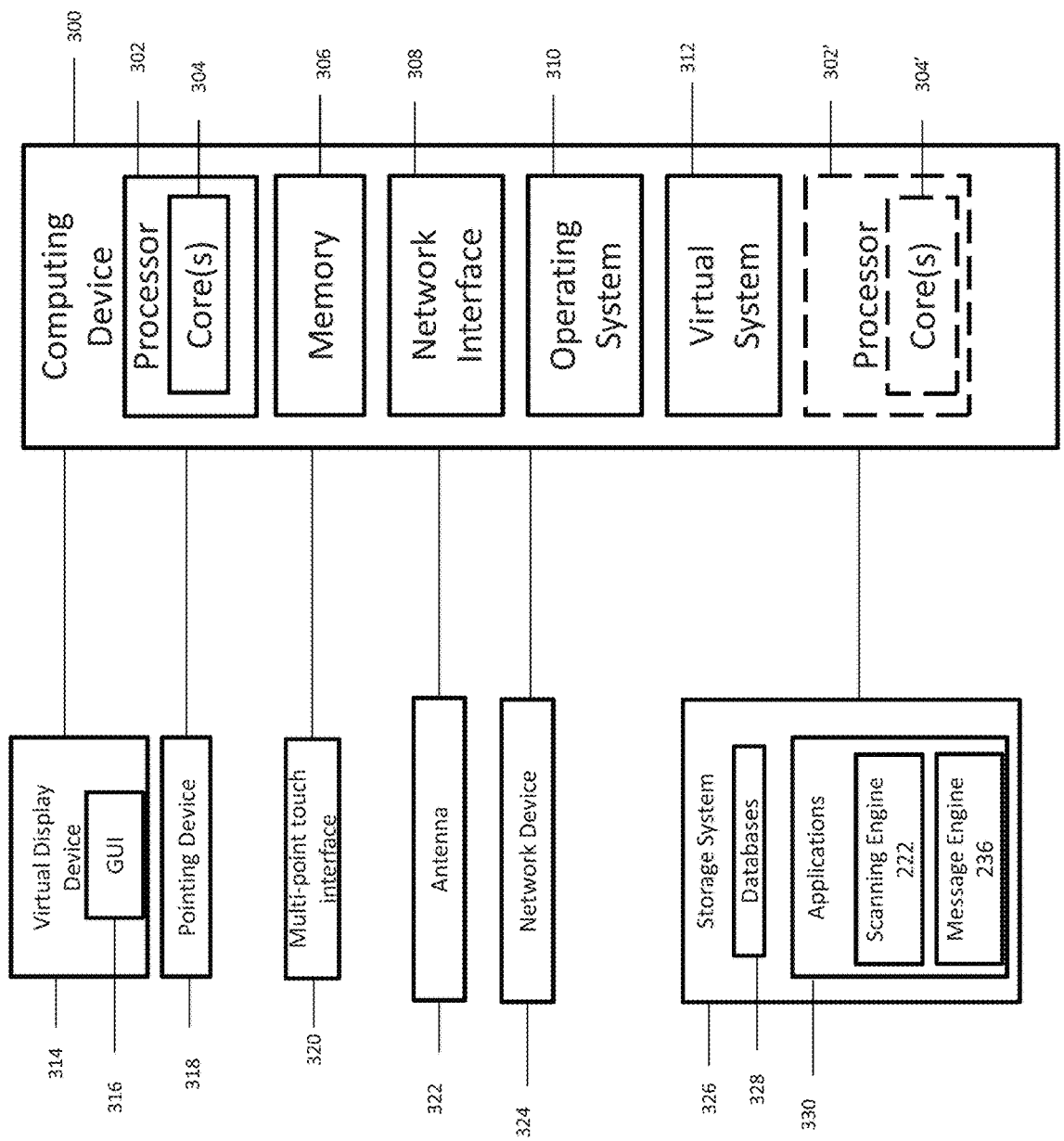
FIG. 3 is a block diagram illustrating an exemplary computing device in accordance with an exemplary embodiment.

FIG. 3 is a block diagram of an example computing device for implementing exemplary embodiments. The computing device 300 can implement embodiments of the infected file detection and quarantine system. Embodiments of the computing device 300 can form the pre-scan staging server 104, the post-scan staging server 106, computing devices in the computing system 108, the server 210, and/or the external sources 240. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the scanning engine 222 or the message engine 236) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 304 so that infrastructure and resources in the computing device 304 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 406 may include other types of memory as well, or combinations thereof.

A user may interact with the computing device 300 through a visual display device 314, such as a computer monitor, which may display the graphical user interfaces 314. The computing device 300 can include input/output devices such as multi touch interface 320, a keyboard and a pointing device 318.

The computing device 300 may also include one or more storage devices 326, such as a hard-drive, CD-ROM, or other computer readable media, for storing data and computer-readable instructions and/or software that implement exemplary embodiments (e.g., applications such as the scanning engine 222 and the message engine 236). For example, exemplary storage device 326 can include one or more databases 328 for storing information regarding metrics, backend data and virus scan programs. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 408 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 304 may run operating system 310, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
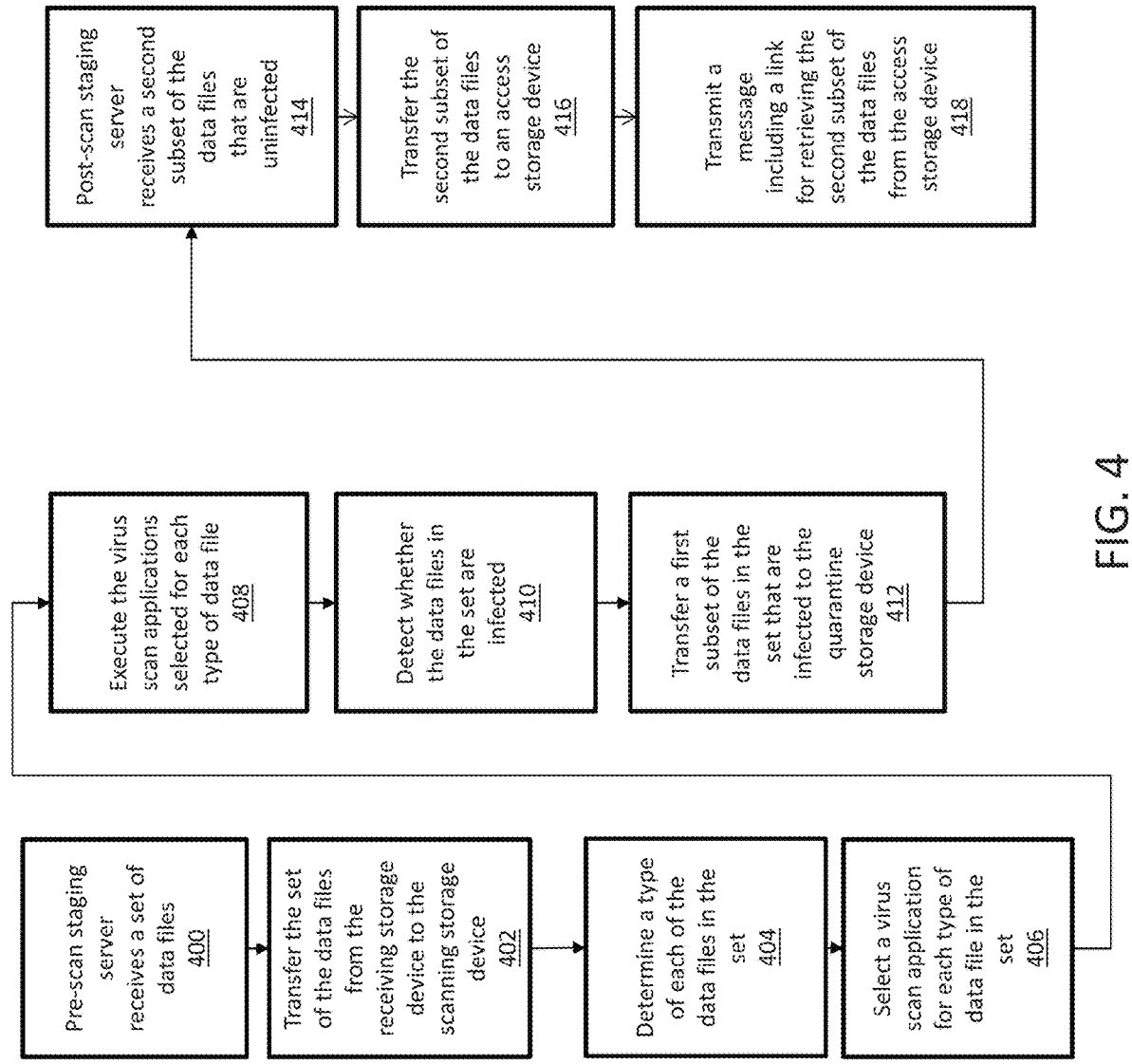
FIG. 4 is a flowchart illustrating an exemplary process performed in an infected file detection and quarantine system according to an exemplary embodiment.

FIG. 4 is a flowchart illustrating an exemplary process performed in the infected file detection and quarantine system according to an exemplary embodiment. In operation 500 the pre-scan staging server (e.g. pre-scan staging server 104 as shown in FIGS. 1-2) can receive a set of data files. The pre-scan staging server includes a receiving storage device (e.g. receiving storage device 220 as shown in FIG.

2), a scanning storage device (e.g. scanning storage device 222 as shown in FIG. 2) and a quarantine storage device (e.g. quarantine storage device 224 as shown in FIG. 2). The set of data files can be stored in the receiving storage device upon receipt by the pre-scan staging server. In operation 502, the pre-scan staging server can transfer the set of the data files from the receiving storage device to the scanning storage device in response to execution a pre-scan process. In operation 504, the pre-scan staging server can determine a type of each of the data files in the set. In operation 506, the pre-scan staging server can select a virus scan application for each type of data file in the set. In operation 508, the pre-scan staging server can execute the virus scan applications selected for each type of data file on the data files in the set based on the type of data file. In operation 510, the pre-scan staging server can detect whether the data files in the set are infected with a virus or malware in response to execution of the at least one virus scan application for each data file type. In operation 512, the pre-scan staging server can transfer a first subset of the data files in the set that are infected with the virus or the malware from the scanning storage device to the quarantine storage device. In operation 514, the post-scan staging server (e.g. post-scan staging server 106 as shown in FIG. 2) can receive a second subset of the data files in the set that are determined to be uninfected in response to execution of the at least one virus scan application for each data file type. The second subset of the data files can be stored in a post-scan storage device (e.g. post scan storage device 232 as shown in FIG. 2) of the post-scan staging server upon receipt by the post-scan staging server. In operation 514, the post-scan staging server can transfer the second subset of the data files from the post-scan storage device to an access storage device (e.g. access storage device 234 as shown in FIG. 2) of the post-scan staging server. In operation 516, the post-scan staging server can transmit a message including a link for retrieving the second subset of the data files to a user account of a user associated with the second subset of the data files in response to transferring the second subset of the data files to the access storage device. The user can access the message via a computing system (e.g. computing system 108 as shown in FIGS. 1-2).

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present this disclosure. Further still, other aspects, functions and advantages such as different combinations of the described embodiments are also within the scope of the present of this disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

I claim:

1. An infected file detection system, the system comprising:
   a pre-scan staging server including a receiving storage device, a scanning storage device, and a quarantine storage device and executing a first operating system that is different than a second operating system executed by a user computing system, the pre-scan staging server configured to:
      receive, in the receiving storage device, a set of data files;
      transfer the set of the data files to the scanning storage device in response to execution a pre-scan process;
      emulate the first operating system in the second operating system;
      determine a type of each of the data files in the set;
      select at least one virus scan application from a plurality of virus scan applications for each type of data file in the set;
      execute the at least one virus scan application selected for each type of data file on the data files in the set based on the type of data file;
      detect whether the data files in the set are infected with a virus or malware in response to execution of the at least one virus scan application for each data file type;
      transfer a first subset of the data files in the set that are infected with the virus or the malware to the quarantine storage device of the pre-scan staging server; and
      receive a second set of data files to be scanned from a forensic system;
   a post-scan staging server with a post-scan storage device and access storage device, the post-scan server being operatively coupled to the pre-scan staging server, the post-scan staging server configured to:
      receive, in the post-scan storage device from the pre-scan server, a second subset of the data files in the set that are determined to be virus free and malware free in response to execution of the at least one virus scan application for each data file type;
      transfer second subset of the data files to the access storage device; and
      transmit a message including a link for retrieving the second subset of the data files to a user account of a user in the user computer system associated with the second subset of the data files in response to transferring the second subset of the data files to the access storage device.

2. The system of claim 1, wherein the first subset of the data files is irretrievable by the user.

3. The system of claim 1, wherein the pre-scan staging server receives the set of data files from one or more of: external hard drives, a web application or a mobile device.

4. The system of claim 1, further comprising:
   a computing system communicatively coupled to the post-scan staging server, the computing system being configured to receive the message from the post scan staging server.

5. The system of claim 1, wherein the link references a location of the second subset of the data files in the access storage device.

6. The system of claim 1, wherein the message includes a first list including the first subset of the data files and a second list identifying the second subset of the data files.

7. The system of claim 1, wherein the post-scan staging server is further configured to erase the second subset of the data files stored in the access storage device after a specified amount of time.

8. The system of claim 1, wherein the post-scan staging server is further configured to track a quantity of infected data files.

9. The system of claim 8, wherein the post-scan staging server is further configured to generate a graphical representation corresponding to the quantity of infected data files.

10. The system of claim 9, wherein the message includes the graphical representation.

11. An infected file detection method, the system comprising:
  receiving a set of data files via a pre-scan staging server, the pre-scan staging server including a receiving storage device, a scanning storage device, and a quarantine storage device and executing a first operating system that is different than a second operating system executed by a user computing system, the set of data files being stored in the receiving storage device upon receipt by the pre-scan staging server;
  transferring, via the pre-scan staging server, the set of the data files from the receiving storage device to the scanning storage device in response to execution a pre-scan process;
  emulating the first operating system in the second operating system;
  determining, via the pre-scan staging server, a type of each of the data files in the set;
  selecting, via the pre-scan staging server, at least one virus scan application from a plurality of virus scan applications for each type of data file in the set;
  executing, via the pre-scan staging server, the at least one virus scan application selected for each type of data file on the data files in the set based on the type of data file;
  detecting, via the pre-scan staging server, whether the data files in the set are infected with a virus or malware in response to execution of the at least one virus scan application for each data file type;
  transferring, via the pre-scan staging server, a first subset of the data files in the set that are infected with the virus or the malware from the scanning storage device to the quarantine storage device; and
  receiving, via the pre-scan staging server, a second set of data files to be scanned from a forensic system;
  receiving, via a post-scan staging server, a second subset of the data files in the set that are determined to be virus free and malware free in response to execution of the at least one virus scan application for each data file type, the second subset of the data files being stored in a post-scan storage device of the post-scan staging server upon receipt by the post-scan staging server;
  transferring, via the post-scan staging server, the second subset of the data files from the post-scan storage device to an access storage device of the post-scan staging server; and
  transmitting, via the post-scan staging server, a message including a link for retrieving the second subset of the data files to a user account of a user associated with the second subset of the data files in response to transferring the second subset of the data files to the access storage device.

12. The method of claim 11, wherein the first subset of the data file is irretrievable by the user.

13. The method of claim 11, wherein the pre-scan staging server receives the set of data files from one or more of: external hard drives, a web application or a mobile device.

14. The method of claim 11, further comprising:
  receiving the message from the post scan staging server via a computing system communicatively coupled to the post-scan staging server.

15. The method of claim 11, wherein the link references a location of the second subset of the data files in the access storage device.

16. The method of claim 11, wherein the message includes a first list including the first subset of the data files and a second list identifying the second subset of the data files.

17. The method of claim 11, further comprising:
  erasing, via the post-scan staging server, the second subset of the data files stored in the access storage device after a specified amount of time.

18. The method of claim 11, further comprising:
  tracking, via the post-scan staging server, a quantity of infected data files.

19. The method of claim 18, further comprising:
  generating, via the post-scan staging server, a graphical representation corresponding to the quantity of infected data files.

20. One or more non-transitory computer readable memory media storing instructions, wherein the instructions are executable by one or more processors to:
  receive a set of data files via a pre-scan staging server, the pre-scan staging server including a receiving storage device, a scanning storage device, and a quarantine storage device and executing a first operating system that is different than a second operating system executed by a user computing system, the set of data files being stored in the receiving storage device upon receipt by the pre-scan staging server;
  transfer, via the pre-scan staging server, the set of the data files from the receiving storage device to the scanning storage device in response to execution a pre-scan process;
  emulate the first operating system in the second operating system;
  determine, via the pre-scan staging server, a type of each of the data files in the set;
  select, via the pre-scan staging server, at least one virus scan application from a plurality of virus scan applications for each type of data file in the set;
  execute, via the pre-scan staging server, the at least one virus scan application selected for each type of data file on the data files in the set based on the type of data file;
  detect, via the pre-scan staging server, whether the data files in the set are infected with a virus or malware in response to execution of the at least one virus scan application for each data file type;
  transfer, via the pre-scan staging server, a first subset of the data files in the set that are infected with the virus or the malware from the scanning storage device to the quarantine storage device; and
  receive, via the pre-scan staging server, a second set of data files to be scanned from a forensic system;
  receive, via a post-scan staging server, a second subset of the data files in the set that are determined to be virus free and malware free in response to execution of the at least one virus scan application for each data file type, the second subset of the data files being stored in a post-scan storage device of the post-scan staging server upon receipt by the post-scan staging server;

transfer, via the post-scan staging server, the second subset of the data files from the post-scan storage device to an access storage device of the post-scan staging server; and transmit, via the post-scan staging server, a message including a link for retrieving the second subset of the data files to a user account of a user associated with the second subset of the data files in response to transferring the second subset of the data files to the access storage device.

* * * * *